United States Patent
Takahashi et al.

(10) Patent No.: US 9,587,196 B2
(45) Date of Patent: Mar. 7, 2017

(54) WORKING FLUID COMPOSITION FOR REFRIGERATOR AND REFRIGERATION OIL

(71) Applicant: JX Nippon Oil & Energy Corporation, Chiyoda-ku, Tokyo (JP)

(72) Inventors: Hitoshi Takahashi, Tokyo (JP); Ken Sawada, Tokyo (JP); Akira Tada, Tokyo (JP); Souichirou Konno, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 15/114,290

(22) PCT Filed: Jan. 19, 2015

(86) PCT No.: PCT/JP2015/051251
§ 371 (c)(1),
(2) Date: Jul. 26, 2016

(87) PCT Pub. No.: WO2015/115232
PCT Pub. Date: Aug. 6, 2015

(65) Prior Publication Data
US 2017/0009170 A1 Jan. 12, 2017

(30) Foreign Application Priority Data
Jan. 28, 2014 (JP) .................................. 2014-013594

(51) Int. Cl.
*C10M 105/38* (2006.01)
*C09K 5/04* (2006.01)
*C10M 171/00* (2006.01)

(52) U.S. Cl.
CPC ........... *C10M 105/38* (2013.01); *C09K 5/045* (2013.01); *C10M 171/008* (2013.01); *C09K 2205/122* (2013.01); *C09K 2205/126* (2013.01); *C10M 2207/2835* (2013.01); *C10M 2215/086* (2013.01); *C10M 2223/06* (2013.01); *C10M 2223/065* (2013.01); *C10N 2220/302* (2013.01); *C10N 2230/06* (2013.01); *C10N 2240/30* (2013.01)

(58) Field of Classification Search
CPC ........... C10M 171/008; C10N 2040/30; C10N 2030/00; C09K 2205/104; C09K 2205/122; C09K 2205/126; C09K 2205/24; C09K 5/045
USPC .................................................. 252/68, 67
See application file for complete search history.

(56) References Cited

U.S. PATENT DOCUMENTS

| 5,498,356 | A  | * | 3/1996 | Kamakura | ........... C10M 133/22 252/68 |
| 7,507,348 | B2 | * | 3/2009 | Kajiki | ..................... C09K 5/045 252/68 |
| 9,005,470 | B2 | * | 4/2015 | Takigawa | ........... C10M 171/008 252/68 |
| 9,234,155 | B2 | * | 1/2016 | Saito | ...................... C09K 5/045 |

(Continued)

FOREIGN PATENT DOCUMENTS

| JP | 8-120288 A | 5/1996 |
| JP | 9-189453 A | 7/1997 |
| JP | 2001-226690 A | 8/2001 |
| JP | 3354152 B2 | 12/2002 |
| JP | 2006-342357 A | 12/2006 |
| WO | WO 2010/029704 A1 | 3/2010 |

OTHER PUBLICATIONS

U.S. Appl. No. 15/025,855, filed Mar. 29, 2016.*
U.S. Appl. No. 15/113,138, filed Jul. 21, 2016.*
U.S. Appl. No. 15/116,110, filed Aug. 2, 2016.*
U.S. Appl. No. 15/304,775, filed Oct. 17, 2016.*
U.S. Appl. No. 15/305,568, filed Oct. 20, 2016.*
U.S. Appl. No. 15/310,398, filed Nov. 10, 2016.*
International Bureau of WIPO, International Preliminary Report on Patentability in International Patent Application No. PCT/JP2015/051251 (Aug. 11, 2016) 5 pp.
Japanese Patent Office, Office Action issued in Japanese Patent Application No. 2014-013594 (Oct. 4, 2016) 4 pp.

*Primary Examiner* — Douglas McGinty
(74) *Attorney, Agent, or Firm* — Leydig, Voit & Mayer, Ltd.

(57) ABSTRACT

Disclosed is a working fluid composition for a refrigerating machine, comprising a refrigerating machine oil comprising an ester of a polyhydric alcohol and a fatty acid, a carbodiimide compound, and a phosphorous compound, and at least one refrigerant selected from 1, 1, 1,2-tetrafluoroethane and 2,3,3,3-tetrafluoropropene, the fatty acid comprises at least one selected from fatty acids having 4 to 9 carbon atoms, and the carbodiimide compound and the phosphorus compound satisfy the conditions represented by the formula (1):

$$0.11 \leq \frac{\left(\frac{N_C}{M_C} \cdot W_C\right)}{\left(\frac{N_P}{M_P} \cdot W_P\right)} \leq 4.70 \quad (1)$$

wherein, $N_c$ represents the number of carbodiimide groups per molecule of the carbodiimide compound, $M_c$ represents the molecular weight of the carbodiimide compound, $W_c$ represents the content of the carbodiimide compound, $N_p$ represents the number of phosphorus atoms per molecule of the phosphorus compound, $M_p$ represents the molecular weight of the phosphorus compound, and $W_p$ represents the content of the phosphorus compound.

5 Claims, No Drawings

(56) References Cited

U.S. PATENT DOCUMENTS

| | | | | |
|---|---|---|---|---|
| 9,328,306 B2* | 5/2016 | Kishi | ................... | C10M 105/38 |
| 2015/0001438 A1* | 1/2015 | Kishi | ..................... | C09K 5/041 |
| | | | | 252/68 |
| 2015/0090921 A1* | 4/2015 | Kishi | ...................... | C07C 69/33 |
| | | | | 252/68 |
| 2016/0244691 A1* | 8/2016 | Takahashi | .......... | C10M 171/008 |
| 2016/0244692 A1* | 8/2016 | Takahashi | .............. | C09K 5/045 |

* cited by examiner

WORKING FLUID COMPOSITION FOR REFRIGERATOR AND REFRIGERATION OIL

CROSS-REFERENCE TO RELATED APPLICATIONS

This patent application is the U.S. national phase of International Application No. PCT/JP2015/051251, filed on Jan. 19, 2015, which claims the benefit of Japanese Patent Application No. 2014-013594, filed Jan. 28, 2014, the disclosures of which are incorporated herein by reference in their entireties for all purposes.

TECHNICAL FIELD

The present invention relates to a working fluid composition for a refrigerating machine and a refrigerating machine oil.

BACKGROUND ART

CFCs (chlorofluorocarbons) and HCFCs (hydrochlorofluorocarbons), which have been used as refrigerants for conventional refrigeration equipment, have become objects of regulations due to the problem of recent ozone layer depletion, and HFCs (hydrofluorocarbons) have come to be used as refrigerants instead of them. Of HFC refrigerants, for example, R134a is normally used as a refrigerant for automobile air conditioners. Furthermore, recently, use of unsaturated fluorinated hydrocarbon refrigerants such as HFO-1234yf has been suggested, of which ozone depletion potential (ODP) and global warming potential (GWP) are both very small and of which thermodynamic properties, which are measures of refrigerant performance, are equivalent to or greater than those of R134a.

For example, in Patent Literature 1, a refrigerating machine oil that contains a polyol ester composed of a polyhydric alcohol selected from pentaerythritol, trimethylolpropane, and neopentyl glycol and a fatty acid and predetermined additives, as a refrigerating machine oil for R134a, is disclosed. Alternatively, for example, in Patent Literature 2, a refrigerating machine oil that contains, as the main component, an ester of one or more selected from neopentyl glycol, trimethylolpropane, pentaerythritol, and dipentaerythritol and one or more selected from monovalent fatty acids having 7 to 9 carbon atoms, as a refrigerating machine oil for HFO-1234yf, is disclosed.

CITATION LIST

Patent Literature

Patent Literature 1: Japanese Unexamined Patent Publication No. H09-189453
Patent Literature 2: International Publication WO No. 2010/029704

SUMMARY OF INVENTION

Technical Problem

However, according to the investigation of the present inventors, even the refrigerating machine oils disclosed in Patent Literatures 1 and 2, there is still a room of improvement in terms of achieving both lubricity (in particular, antiwear property) and stability.

The present invention has been made in consideration of such circumstances and has an object to provide a working fluid composition for a refrigerating machine and a refrigerating machine oil that is capable of achieving both antiwear property and stability.

Solution to Problem

To solve the problem described above, the present invention provides a working fluid composition for a refrigerating machine which contains a refrigerating machine oil containing an ester of a polyhydric alcohol and a fatty acid, a carbodiimide compound, and a phosphorous compound, and at least one refrigerant selected from 1,1,1,2-tetrafluoroethane and 2,3,3,3-tetrafluoropropene, wherein the polyhydric alcohol constituting the ester contains pentaerythritol and dipentaerythritol, the fatty acid constituting the ester contains at least one selected from fatty acids having 4 to 9 carbon atoms, and the carbodiimide compound and the phosphorus compound satisfy the conditions represented by the following formula (1).

$$0.11 \leq \frac{\left(\frac{N_C}{M_C} \cdot W_C\right)}{\left(\frac{N_P}{M_P} \cdot W_P\right)} \leq 4.70 \quad (1)$$

In the formula (1), $N_C$ represents the number of carbodiimide groups per molecule of the carbodiimide compound, $M_C$ represents the molecular weight of the carbodiimide compound, $W_C$ represents the content of the carbodiimide compound based on the total amount of the refrigerating machine oil, $N_P$ represents the number of phosphorus atoms per molecule of the phosphorus compound, $M_P$ represents the molecular weight of the phosphorus compound, and $W_P$ represents the content of the phosphorus compound based on the total amount of the refrigerating machine oil.

According to the above working fluid composition for a refrigerating machine, it is possible to achieve both antiwear property and stability at a high level. The present inventors infer the reason why the effect is obtained as follows.

In the case of the working fluid composition for a refrigerating machine according to the present invention, it is conceivable that both antiwear property and stability can be achieved at a high level because stability is sufficiently maintained as well as it is possible to sufficiently suppress a phenomenon in which adsorption of the phosphorus compound onto sliding portions is inhibited by the carbodiimide compound by blending a phosphorus compound, which imparts antiwear property so as to satisfy the above formula (1), and a carbodiimide compound, which imparts stability, to the above specific ester.

In the above ester, aspects of the following (i) and (ii) are included:
(i) an ester containing a first ester that is an ester of pentaerythritol and at least one fatty acid selected from fatty acids having 4 to 9 carbon atoms and a second ester that is an ester of dipentaerythritol and at least one fatty acid selected from fatty acids having 4 to 9 carbon atoms; and
(ii) an ester containing an ester obtained by reacting a mixture of a polyhydric alcohol containing pentaerythritol and dipentaerythritol with at least one fatty acid selected from fatty acids having 4 to 9 carbon atoms.

Furthermore, in the above aspect of (i), it is preferable that the content of the second ester be 10% by mass or more and 40% by mass or less based on the total of the content of the first ester and the content of the second ester.

It is preferable that the refrigerating machine oil further contain 0.1% by mass or more and 0.5% by mass or less of 2,6-di-tert-butyl-p-cresol based on the total amount of the refrigerating machine oil.

The present invention also provides a refrigerating machine oil that contains an ester of a polyhydric alcohol and a fatty acid, a carbodiimide compound, and a phosphorus compound, wherein the polyhydric alcohol constituting the ester contains pentaerythritol and dipentaerythritol, the fatty acid constituting the ester contains at least one selected from fatty acids having 4 to 9 carbon atoms, the carbodiimide compound and the phosphorus compound satisfy the conditions represented by the following formula (1), and the refrigerating machine oil is used together with at least one refrigerant selected from 1,1,1,2-tetrafluoroethane and 2,3,3,3-tetrafluoropropene.

$$0.11 \leq \frac{\left(\frac{N_C}{M_C} \cdot W_C\right)}{\left(\frac{N_P}{M_P} \cdot W_P\right)} \leq 4.70 \quad (1)$$

In the formula (1), $N_C$ represents the number of carbodiimide groups per molecule of the carbodiimide compound, $M_C$ represents the molecular weight of the carbodiimide compound, $W_C$ represents the content of the carbodiimide compound based on the total amount of the refrigerating machine oil, $N_P$ represents the number of phosphorus atoms per molecule of the phosphorus compound, $M_P$ represents the molecular weight of the phosphorus compound, and $W_P$ represents the content of the phosphorus compound based on the total amount of the refrigerating machine oil.

Advantageous Effects of Invention

According to the present invention, it is possible to provide a working fluid composition for a refrigerating machine and a refrigerating machine oil that can achieve both antiwear property and stability.

DESCRIPTION OF EMBODIMENTS

Hereinbelow, preferred embodiments of the present invention will be described in detail.

A refrigerating machine oil according to the present embodiment contains an ester of polyhydric alcohol and a fatty acid, a carbodiimide compound, and a phosphorus compound and is used together with at least one refrigerant selected from 1,1,1,2-tetrafluoroethane and 2,3,3,3-tetrafluoropropene. The polyhydric alcohol constituting the ester contains pentaerythritol and dipentaerythritol, the fatty acid constituting the ester contains at least one selected from fatty acids having 4 to 9 carbon atoms, and the carbodiimide compound and the phosphorus compound satisfy the conditions represented by the following formula (1).

$$0.11 \leq \frac{\left(\frac{N_C}{M_C} \cdot W_C\right)}{\left(\frac{N_P}{M_P} \cdot W_P\right)} \leq 4.70 \quad (1)$$

In the formula (1), $N_C$ represents the number of carbodiimide groups per molecule of the carbodiimide compound, $M_C$ represents the molecular weight of the carbodiimide compound, $W_C$ represents the content of the carbodiimide compound based on the total amount of the refrigerating machine oil, $N_P$ represents the number of phosphorus atoms per molecule of the phosphorus compound, $M_P$ represents the molecular weight of the phosphorus compound, and $W_P$ represents the content of the phosphorus compound based on the total amount of the refrigerating machine oil.

A working fluid composition for a refrigerating machine according to the present embodiment contains a refrigerating machine oil that comprises an ester of a polyhydric alcohol and a fatty acid, a carbodiimide compound, and a phosphorus compound, and at least one refrigerant selected from 1,1,1,2-tetrafluoroethane and 2,3,3,3-tetrafluoropropene. The polyhydric alcohol constituting the ester contains pentaerythritol and dipentaerythritol, the fatty acid constituting the ester comprises at least one selected from fatty acids having 4 to 9 carbon atoms, and the carbodiimide compound and the phosphorus compound satisfy the conditions represented by the above formula (1). In the working fluid composition for a refrigerating machine according to the present embodiment, an aspect containing the refrigerating machine oil according to the present embodiment and at least one refrigerant selected from 1,1,1,2-tetrafluoroethane and 2,3,3,3-tetrafluoropropene are included.

The refrigerating machine oil according to the present embodiment contains an ester of a polyhydric alcohol and a fatty acid as a base oil. The polyhydric alcohol constituting the ester contains pentaerythritol and dipentaerythritol, and the fatty acid constituting the ester contains at least one selected from fatty acids having 4 to 9 carbon atoms.

In the above ester, aspects of the following (i) and (ii) are included:

(i) an ester containing a first ester that is an ester of pentaerythritol and at least one fatty acid selected from fatty acids having 4 to 9 carbon atoms and a second ester that is an ester of dipentaerythritol and at least one fatty acid selected from fatty acids having 4 to 9 carbon atoms; and (ii) an ester containing an ester obtained by reacting a mixture of a polyhydric alcohol containing pentaerythritol and dipentaerythritol with at least one fatty acid selected from fatty acids having 4 to 9 carbon atoms.

It is preferable that the above ester contain a first ester that is an ester of pentaerythritol and at least one fatty acid selected from fatty acids having 4 to 9 carbon atoms and a second ester that is an ester of dipentaerythritol and at least one fatty acid selected from fatty acids having 4 to 9 carbon atoms. The content of first ester is preferably 60% by mass or more, more preferably 65% by mass or more, still more preferably 70% by mass or more, and also, preferably 90% by mass or less, more preferably 85% by mass or less, still more preferably 80% by mass or less, based on the total of the content of the first ester and the content of the second ester. The content of the second ester is preferably 10% by mass or more, more preferably 15% by mass or more, still more preferably 20% by mass or more, and also, preferably 40% by mass or less, more preferably 35% by mass or less, still more preferably 30% by mass or less, based on the total of the content of the first ester and the content of the second ester. When the contents of the first ester and the second ester is within the above range, it is possible to sufficiently ensure the antiwear property.

The content of the above ester is preferably 70% by mass or more, more preferably 80% by mass or more, still more preferably 90% by mass or more based on the total amount of the refrigerating machine oil, from the viewpoint of being excellent in various performance such as lubricity, refrigerant compatibility, thermal and chemical stability, and electrical insulation. The content of the above ester can be 99% by mass or less based on the total amount of the refrigerating machine oil.

As the polyhydric alcohol, other polyhydric alcohols may be used in addition to pentaerythritol and dipentaerythritol. As the other polyhydric alcohol, it is possible to use a polyhydric alcohol having 2 to 6 hydroxyl groups, for example. The content of the other polyhydric alcohol can be 50 mol % or less based on the total amount of the polyhydric alcohol constituting the ester.

Specific examples of a divalent alcohol (diol) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Specific examples of a trivalent or more alcohol include polyhydric alcohols, such as trimethylolethane, trimethylolpropane, trimethylolbutane, di-(trimethylolpropane), tri-(trimethylolpropane), tri-(pentaerythritol), glycerin, polyglycerin (dimer or trimer of glycerin), 1,3,5-pentanetriol, sorbitol, sorbitan, sorbitol-glycerin condensates, adonitol, arabitol, xylitol, and mannitol, saccharides, such as xylose, arabinose, ribose, rhamnose, glucose, fructose, galactose, mannose, sorbose, and cellobiose, and partially etherified products thereof. Of these, hindered alcohols, such as neopentyl glycol, trimethylolethane, trimethylolpropane, trimethylolbutane, di-(trimethylolpropane), and tri-(trimethylolpropane) are preferable.

Examples of the fatty acids having 4 to 9 carbon atoms specifically include linear or branched butanoic acids, linear or branched pentanoic acids, linear or branched hexanoic acids, linear or branched heptanoic acids, linear or branched octanoic acids, and linear or branched nonanoic acids. Of these, fatty acids having a branch at the α-position and/or the β-position, and, for example, 2-methyl-propanoic acid, 2-methyl-butanoic acid, 2-methyl-pentanoic acid, 2-methyl-hexanoic acid, 2-ethyl-pentanoic acid, 2-methyl-heptanoic acid, 2-ethyl-hexanoic acid, and 3,5,5-trimethyl-hexanoic acid are preferable. Additionally, mixed acids of 2-methyl propanoic acid and 3,5,5-trimethyl hexanoic acid and mixed acids of 2-ethyl hexanoic acid and 3,5,5-trimethyl hexanoic acid are more preferable, and mixed acids of 2-ethyl hexanoic acid and 3,5,5-trimethyl hexanoic acid are still more preferable.

As the fatty acid, in addition to fatty acids having 4 to 9 carbon atoms, it is possible to use other fatty acids. Examples of the other fatty acids include fatty acids having 10 to 24 carbon atoms. The content of the other fatty acid can be 50 mol % or less based on the total amount of the fatty acid constituting the ester.

Examples of the other fatty acids more specifically include linear or branched decanoic acids, linear or branched undecanoic acids, linear or branched dodecanoic acids, linear or branched tridecanoic acids, linear or branched tetradecanoic acids, linear or branched pentadecanoic acids, linear or branched hexadecanoic acids, linear or branched heptadecanoic acids, linear or branched octadecanoic acids, linear or branched nonadecanoic acids, linear or branched icosanoic acids, linear or branched heneicosanoic acids, linear or branched docosanoic acids, linear or branched tricosanoic acids, and linear or branched tetracosanoic acids.

The ester according to the present embodiment may be a partial ester in which some hydroxyl groups of the polyhydric alcohol are not esterified and remains as the hydroxyl groups, may be a complete ester in which all the hydroxyl groups are esterified, or may be a mixture of a partial ester and a complete ester. The hydroxyl value of the ester is preferably 10 mg KOH/g or less, more preferably 5 mg KOH/g or less, still more preferably 3 mg KOH/g or less.

The base oil may comprise other base oil in addition to the ester according to the present embodiment. As the other base oil, examples include hydrocarbon oils, such as mineral oils, olefin polymers, naphthalene compounds, and alkylbenzenes, ester base oils other than the esters according to the present embodiment, synthetic oils composed of a compound having oxygen atoms, such as polyglycols, polyvinyl ethers, ketones, polyphenyl ethers, silicones, polysiloxanes, and perfluoroethers. As the synthetic oil composed of a compound having oxygen atoms, polyglycols, polyvinyl ethers, and ketones are preferably used of above oils. The content of the other base oil can be 50% by mass or less based on the total amount of the base oil.

The kinematic viscosity of the base oil at 40° C. can be preferably 3 mm$^2$/s or more, more preferably 4 mm$^2$/s or more, still more preferably 5 mm$^2$/s or more, and preferably 1000 mm$^2$/s or less, more preferably 500 mm$^2$/s or less, still more preferably 400 mm$^2$/s or less. The kinematic viscosity of the base oil at 100° C. can be preferably 1 mm$^2$/s or more, more preferably 2 mm$^2$/s or more, and can be preferably 100 mm$^2$/s or less, more preferably 50 mm$^2$/s or less.

The refrigerating machine oil according to the present embodiment comprises a carbodiimide compound and a phosphorus compound in addition to the oil described above. The carbodiimide compound and the phosphorus compound satisfy the conditions represented by the following formula (1).

$$0.11 \leq \frac{\left(\frac{N_C}{M_C} \cdot W_C\right)}{\left(\frac{N_P}{M_P} \cdot W_P\right)} \leq 4.70 \tag{1}$$

In the formula (1), $N_C$ represents the number of carbodiimide groups per molecule of the carbodiimide compound, $M_C$ represents the molecular weight of the carbodiimide compound, $W_C$ represents the content of the carbodiimide compound based on the total amount of the refrigerating machine oil (unit: % by mass), $N_P$ represents the number of phosphorus atoms per molecule of the phosphorus compound, $M_P$ represents the molecular weight of the phosphorus compound, and $W_P$ represents the content of the phosphorus compound based on the total amount of the refrigerating machine oil (unit: % by mass).

Hereinbelow, description will be made by conveniently assuming that the middle term of the formula (1) is C/P (that is, $C=(N_C/M_C)\cdot W_C$, $P=(N_P/M_P)\cdot W_P$). C/P is 0.11 or more, it is preferable that CP be 0.12 or more, and it is more preferable that CP be 0.15 or more. By the fact that C/P is 0.11 or more, it is possible to enhance the stability of the refrigerating machine oil. Additionally, C/P is 4.70 or less, it is preferable that CP be 4.50 or less, and it is more preferable that CP be 3.90 or less. By the fact that C/P is 4.70 or less, since it is possible to sufficiently exert the function of the phosphorus compound as an anti-wear agent, it is possible to enhance the antiwear property of the refrigerating machine oil.

It should be noted that that in the case where the refrigerating machine oil comprises a plurality of carbodiimide compounds, $Ci=(N_C/M_C)\cdot W_C$ is calculated for each carbodiimide compound, and the sum of all the Ci's calculated is taken as C, which is used in the formula (1). Similarly, in the case where the refrigerating machine oil comprises a plurality of phosphorus compounds, $Pi=(N_P/M_P)\cdot W_P$ is calculated for each phosphorus compound, and the sum of all the Pi's is taken as P, which is used in the formula (1).

As the carbodiimide compound, which is not particularly limited, for example, it is possible to use dialkylcarbodiimides, diphenylcarbodiimide, and bis(alkylphenyl)carbodiimides.

Examples of the alkylcarbodiimide include diisopropylcarbodiimide and dicyclohexylcarbodiimide.

Examples of the bis (alkylphenyl)carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

The content of the carbodiimide compound, which may be set as appropriate so as to satisfy the conditions represented by the above formula (1), is preferably 0.01% by mass or more, more preferably 0.05% by mass or more, still more preferably 1.0% by mass or more, and also, preferably 10% by mass or less, more preferably 8% by mass or less, still more preferably 5% by mass or less, based on the total amount of the refrigerating machine oil composition.

Examples of the phosphorus compound (also referred to as a "phosphorus-based additive" or a "phosphorus-based anti-wear agent") include, but not particularly limited to, phosphoric esters, acidic phosphoric esters, thiophosphates, amine salts of acidic phosphoric esters, chlorinated phosphoric esters, and phosphite esters. These phosphorus compounds may be used singly, or two or more of these can be used in combination.

Examples of the phosphoric ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate.

Examples of the acidic phosphoric ester include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the thiophosphoric ester include tributyl phosphorothioate, tripentyl phosphorothioate, trihexyl phosphorothioate, triheptyl phosphorothioate, trioctyl phosphorothioate, trinonyl phosphorothioate, tridecyl phosphorothioate, triundecyl phosphorothioate, tridodecyl phosphorothioate, tritridecyl phosphorothioate, tritetradecyl phosphorothioate, tripentadecyl phosphorothioate, trihexadecyl phosphorothioate, triheptadecyl phosphorothioate, trioctadecyl phosphorothioate, trioleyl phosphorothioate, triphenyl phosphorothioate, tricresyl phosphorothioate, trixylenyl phosphorothioate, cresyl diphenyl phosphorothioate, and xylenyl diphenyl phosphorothioate.

Examples of the amine salt of the acidic phosphoric ester include salts of the above acidic phosphoric ester with an amine such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine, and trioctylamine.

Examples of the chlorinated phosphoric ester include tris-dichloropropyl phosphate, tris-chloroethyl phosphate, tris-chlorophenyl phosphate, and polyoxyalkylene-bis[di(chloroalkyl)] phosphate. Examples of the phosphite ester include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

The content of the phosphorus compound, which may be set as appropriate so as to satisfy the conditions represented by the above formula (1), is preferably 0.1% by mass or more, more preferably 0.2% by mass or more, still more preferably 0.3% by mass or more, and also, preferably 2.4% by mass or less, more preferably 2.0% by mass or less, still more preferably 1.0% by mass or less, based on the total amount of the refrigerating machine oil.

It is preferable that the refrigerating machine oil according to the present embodiment further contain 2,6-di-tert-butyl-p-cresol. The content of 2,6-di-tert-butyl-p-cresol is preferably 0.1% by mass or more, more preferably 0.15% by mass or more, still more preferably 0.2% by mass or more, and also, preferably 0.5% by mass or less, more preferably 0.35% by mass or less, still more preferably 0.3% by mass or less, based on the total amount of the refrigerating machine oil. When the content is the above lower limit or more, it is possible to further enhance the stability of the refrigerating machine oil. In contrast, when the content is the above upper limit or less, it is possible to suppress the coloring of the refrigerating machine oil due to 2,6-di-tert-butyl-p-cresol.

Also, the refrigerating machine oil according to the present embodiment can contain conventionally known additives for refrigerating machine oils in order to further enhance its performance. Examples of such additives include phenol-based antioxidants, such as bisphenol A, 2,6-di-tert-butyl-4-methylphenol, and 4,4'-methylene bis(2,6-di-tert-butylphenol), amine-based antioxidants, such as phenyl-α-naphthylamine and N,N-di(2-naphthyl)-p-phenylenediamine, extreme pressure agents, such as chlorinated paraffin and dibenzyl disulfide, oiliness agents, such as acyl glycerol and glyceryl ether, antifoaming agents, such as dimethylpolysiloxane and perfluoropolyether-modified polysiloxane, metal deactivators, such as benzotriazole, 2,5-dialkylmercapto-1,3,4-thiadiazole, and N,N'-disalicylidene-1,2-diaminopropane, antiwear agents, such as triphenyl phosphate, tricresyl phosphate, and tricresyl phosphorothionate, viscosity index improvers, such as polymethacrylate, olefin copolymers, and polyisobutylene, pour point depressant, such as alkylated aromatic compounds and ethylene-vinyl acetate copolymers (EVA), and detergent dispersants, such as imide succinate and succinic esters. One of these additives may be used singly, or two or more of these additives may be used in combination. The content of these additives is not particularly limited, but is preferably 0.01% by mass or more, more preferably 0.05% by mass or more, still more preferably 0.1% by mass or more, and also, preferably 10% by mass or less, more preferably 5% by mass or less, still more preferably 3% by mass or less, based on the total amount of the refrigerating machine oil.

The volume resistivity of the refrigerating machine oil is not particularly limited, but can be preferably $1.0 \times 10^{12}$ Ω·cm or more, more preferably $1.0 \times 10^{13}$ Ω·cm or more, still more preferably $1.0 \times 10^{14}$ Ω·cm or more. In particular, in the case of use for a hermetic-type refrigerating machine, high electrical insulation tends to be required. The volume resistivity in the present invention means the value measured at 25° C. in compliance with JIS C2101 "Testing methods of electrical insulating oils".

The moisture content of the refrigerating machine oil is not particularly limited, but can be preferably 200 ppm or less, more preferably 100 ppm or less, still more preferably 50 ppm or less based on the total amount of the refrigerating machine oil composition. Particularly, in the case of use for a hermetic-type refrigerating machine, it is required that the moisture content be low, from the viewpoint of the influence on the thermal/chemical stability and the electrical insulation property of the refrigerating machine oil.

The acid value of the refrigerating machine oil is not particularly limited, but can be preferably 0.1 mg KOH/g or less, more preferably 0.05 mg KOH/g or less. The hydroxyl value of the refrigerating machine oil is not particularly limited, but can be preferably 5.0 mg KOH/g or less, more preferably 2.0 mg KOH/g or less. When the acid value and the hydroxyl value of the refrigerating machine oil satisfy the above conditions, it is possible to further prevent corrosion of the metal used in a refrigerating machine or piping. The acid value in the present invention means the acid value measured in compliance with JIS K2501 "Petroleum products and lubricants—Determination of neutralization number", and the hydroxyl value in the present invention means the hydroxyl value measured in compliance with JIS K0070 "Test methods for acid value, saponification value, ester value, iodine value, hydroxyl value and unsaponifiable matter of chemical products".

The ash content of the refrigerating machine oil is not particularly limited, but can be preferably 100 ppm or less, more preferably 50 ppm or less, in order to increase the thermal/chemical stability of the refrigerating machine oil and to suppress the occurrence of sludge or the like. The ash content in the present invention means the value of the ash content measured in compliance with JIS K2272 "Crude oil/petroleum product ash content and sulfated ash content test method".

The pour point of the refrigerating machine oil can be preferably −10° C. or less, more preferably −20° C. or less, still more preferably −30° C. or less. The pour point in the present invention means the pour point measured in compliance with JIS K2269.

The refrigerating machine oil according to the present embodiment is used together with at least one refrigerant selected from 1,1,1,2-tetrafluoroethane (R134a) and 2,3,3,3-tetrafluoropropene (HFO-1234yf). The working fluid composition for a refrigerating machine according to the present embodiment contains at least one refrigerant selected from 1,1,1,2-tetrafluoroethane (R134a) and 2,3,3,3-tetrafluoropropene (HFO-1234yf). Such refrigerants may take aspects of a refrigerant composed only of R134a, of a refrigerant composed only of HFO-1234yf, or of a mixed refrigerant of R134a and HFO-1234yf.

A composition that contains an ester of a polyhydric alcohol and a fatty acid, a carbodiimide compound, and a phosphorus compound and in which the polyhydric alcohol constituting the ester contains pentaerythritol and dipentaerythritol, the fatty acid constituting the ester contains at least one selected from fatty acids having 4 to 9 carbon atoms, and the carbodiimide compound and the phosphorus compound satisfy the conditions represented by the above formula (1) is suitably used as a component of a refrigerating machine oil used together with at least one refrigerant selected from 1,1,1,2-tetrafluoroethane and 2,3,3,3-tetrafluoropropene or as a component of a working fluid composition for a refrigerating machine that contains the refrigerating machine oil and at least one refrigerant selected from 1,1,1,2-tetrafluoroethane and 2,3,3,3-tetrafluoropropene.

A composition that contains an ester of a polyhydric alcohol and a fatty acid, a carbodiimide compound, and a phosphorus compound and in which the polyhydric alcohol constituting the ester contains pentaerythritol and dipentaerythritol, the fatty acid constituting the ester contains at least one selected from fatty acids having 4 to 9 carbon atoms, and the carbodiimide compound and the phosphorus compound satisfy the conditions represented by the above formula (1) is suitably used for manufacture of a component of a refrigerating machine oil used together with at least one refrigerant selected from 1,1,1,2-tetrafluoroethane and 2,3,3,3-tetrafluoropropene or for manufacture of a working fluid composition for a refrigerating machine that contains the refrigerating machine oil and at least one refrigerant selected from 1,1,1,2-tetrafluoroethane and 2,3,3,3-tetrafluoropropene.

The refrigerant used together with the refrigerating machine oil according to the present embodiment or the refrigerant contained in the working fluid composition for a refrigerating machine according to the present embodiment may contain other refrigerant in addition to at least one refrigerant selected from R134a and HFO-1234yf. Examples of other refrigerant include saturated fluorinated hydrocarbon refrigerants other than R134a, unsaturated fluorinated hydrocarbon refrigerants other than HFO-1234yf, fluorine-containing ether-based refrigerants, such as perfluoroethers, bis(trifluoromethyl)sulfide refrigerants, trifluoroiodomethane refrigerants, and natural refrigerant, such as dimethyl ether, carbon dioxide, ammonia, and hydrocarbons.

The content of the refrigerating machine oil in the working fluid composition for a refrigerating machine is not particularly limited, but can be preferably 1 part by mass or more, more preferably 2 parts by mass or more, and also, can be preferably 500 parts by mass or less, more preferably 400 parts by mass or less, based on 100 parts by mass of the refrigerant.

The refrigerating machine oil and the working fluid composition for a refrigerating machine according to the present embodiment are preferably used in air conditioners or refrigerating machines having a reciprocating or rotating closed compressor, or in open or closed automobile air conditioners. The refrigerating machine oil and the working fluid composition for a refrigerating machine according to the present embodiment are preferably used in dehumidifiers, hot water suppliers, cooling apparatuses, such as freezers, freezing-refrigerating warehouses, vending machines, showcases, and chemical plants. The refrigerating machine oil and the working fluid composition for a refrigerating machine according to the present embodiment are also preferably used in those having a centrifugal compressor.

EXAMPLES

Hereinbelow, the present invention will be described more specifically based on examples and comparative examples, but the present invention is not limited in any way by the examples below.

Examples 1 to 10 and Comparative Examples 1 to 20

In Examples 1 to 10 and Comparative Examples 1 to 20, base oils 1, A1, A2, and B1 comprising an ester of a polyhydric alcohol and a fatty acid shown in Table 1 and additives shown below were used to prepare refrigerating machine oils of which composition is shown in Tables 2 to 7. On the refrigerating machine oils prepared in Examples 1 to 10 and Comparative Examples 1 to 20, antiwear property test and stability test were conducted.

TABLE 1

| | | Base oil number | | | |
|---|---|---|---|---|---|
| | | 1 | A1 | A2 | B1 |
| Polyhydric alcohol | | Neopentyl glycol | Pentaerythritol | Pentaerythritol | Dipentaerythritol |
| Fatty acid A | Type | 2-Ethylhexanoic acid | 2-Methylpropanoic acid | 2-Ethylhexanoic acid | 2-Ethylhexanoic acid |
| | Mixing ratio of fatty acid (mol %) | 100 | 35 | 50 | 50 |
| Fatty acid B | Type | — | 3,5,5-trimethyl hexanoic acid | 3,5,5-trimethyl hexanoic acid | 3,5,5-trimethyl hexanoic acid |
| | Mixing ratio of fatty acid (mol %) | — | 65 | 50 | 50 |
| Kinematic viscosity | 40° C. (mm²/s) | 7.5 | 69.4 | 68.4 | 222.5 |
| | 100° C. (mm²/s) | 2.0 | 8.2 | 8.4 | 18.8 |

<Additives>
C1: Bis(diisopropylphenyl)carbodiimide
C2: Diisopropylcarbodiimide
D1: Tricresyl phosphate
D2: Triphenyl phosphorothionate
E1: 2,6-di-tert-butyl-p-cresol (Antiwear Property Test)

A High Pressure Ambience Friction & Wear Tester manufactured by Shinko Engineering Co., Ltd. (rotation sliding mode by a rotary vane member and a fixed disc member), which can achieve a refrigerant atmosphere similar to that of an actual compressor, was used for antiwear property test. The test conditions were oil amount: 600 ml, test temperature: 100° C., number of revolutions: 450 rpm, applied load: 60 kgf, and test period: 1 hour. SKH-51 was used as the vane member, and FC250 was used as the disc member. As the refrigerant, 1,1,1,2-tetrafluoroethane (R134a) or 2,3,3,3-tetrafluoropropene (HFO-1234yf) was used, and the pressure inside the test vessel was 1.1 MPa. Antiwear property evaluation was conducted based on the wear depth of the vane member because the amount of wear of the disc was very small. The results obtained are shown in Tables 2 to 7.

(Stability Test)

The stability test was conducted in compliance with JIS K2211-09 (autoclave test). Specifically, 80 g of a sample oil of which moisture content had been adjusted to 100 ppm was weighed into an autoclave. After the sample oil, catalysts (iron, copper, aluminum lines, each in outer diameter of 1.6 mm×length of 50 mm), and 20 g of 1,1,1,2-tetrafluoroethane (R134a) or 2,3,3,3-tetrafluoropropene (HFO-1234yf) were sealed, the mixture was heated to 140° C., and the appearance and acid value of the sample oil after 150 hours were evaluated (JISC2101). The results obtained are shown in Tables 2 to 7.

TABLE 2

| | | Example 1 | Example 2 | Example 3 | Example 4 | Example 5 |
|---|---|---|---|---|---|---|
| Composition of base oil (% by mass, based on the total amount of the base oil) | 1 | — | — | — | — | — |
| | A1 | 70 | — | — | — | — |
| | A2 | — | 90 | 90 | 70 | 60 |
| | B1 | 30 | 10 | 10 | 30 | 40 |
| Composition of refrigerating machine oil (% by mass, based on the total amount of the refrigerating machine oil) | Base oil | 98.45 | 97 | 94.9 | 98 | 96.6 |
| | C1 | — | 2 | 4 | 1 | 2.4 |
| | C2 | 0.05 | — | — | — | — |
| | D1 | — | 0.5 | 1 | 0.5 | 0.5 |
| | D2 | 1 | — | — | — | — |
| | E1 | 0.5 | 0.5 | 0.1 | 0.5 | 0.5 |
| C/P | | 0.14 | 3.82 | 3.82 | 1.91 | 4.59 |
| Refrigerant | | R134a | R134a | R134a | R134a | R134a |
| Antiwear property test | Wear depth (μm) | 6.1 | 7.0 | 7.1 | 5.3 | 5.7 |
| Stability test | Appearance | No deposition | No deposition | No deposition | No deposition | No deposition |
| | Acid value (mgKOH/g) | 0.04 | 0.01 | 0.01 | 0.01 | 0.01 |

TABLE 3

|  |  | Comp. Example 1 | Comp. Example 2 | Comp. Example 3 | Comp. Example 4 | Comp. Example 5 |
| --- | --- | --- | --- | --- | --- | --- |
| Composition of base oil (% by mass, based on the total amount of the base oil) | 1 | 60 | — | — | — | — |
| | A1 | — | 60 | 70 | 70 | 70 |
| | A2 | — | — | — | — | — |
| | B1 | 40 | 40 | 30 | 30 | 30 |
| Composition of refrigerating machine oil (% by mass, based on the total amount of the refrigerating machine oil) | Base oil | 98.7 | 98.95 | 90.5 | 88.5 | 96 |
| | C1 | 0.2 | 0.05 | — | — | — |
| | C2 | — | — | 8 | 10 | 3 |
| | D1 | 0.5 | 0.5 | — | — | — |
| | D2 | — | — | 1 | 1 | 0.5 |
| | E1 | 0.6 | 0.5 | 0.5 | 0.5 | 0.5 |
| C/P | | 0.38 | 0.10 | 21.71 | 27.14 | 16.29 |
| Refrigerant | | R134a | R134a | R134a | R134a | R134a |
| Antiwear property test | Wear depth (μm) | 7.7 | 6.3 | 8.1 | 8.4 | 7.8 |
| Stability test | Appearance | No deposition | No deposition | No deposition | No deposition | No deposition |
| | Acid value (mgKOH/g) | 0.01 | 0.31 | 0.01 | 0.01 | 0.01 |

TABLE 4

|  |  | Comp. Example 6 | Comp. Example 7 | Comp. Example 8 | Comp. Example 9 | Comp. Example 10 | Comp. Example 11 |
| --- | --- | --- | --- | --- | --- | --- | --- |
| Composition of base oil (% by mass, based on the total amount of the base oil) | 1 | — | — | — | — | — | — |
| | A1 | 100 | — | — | — | — | — |
| | A2 | — | 100 | 100 | 70 | 90 | 90 |
| | B1 | — | — | — | 30 | 10 | 10 |
| Composition of refrigerating machine oil (% by mass, based on the total amount of the refrigerating machine oil) | Base oil | 95 | 93.4 | 92.4 | 95 | 94.9 | 93.4 |
| | C1 | — | 5 | 6 | 4 | 4 | 5 |
| | C2 | 4 | — | — | — | — | — |
| | D1 | — | 1 | 1 | 0.5 | 0.5 | 1 |
| | D2 | 0.5 | — | — | — | — | — |
| | E1 | 0.5 | 0.6 | 0.6 | 0.5 | 0.6 | 0.6 |
| C/P | | 21.71 | 4.78 | 5.73 | 7.65 | 7.65 | 4.78 |
| Refrigerant | | R134a | R134a | R134a | R134a | R134a | R134a |
| Antiwear property test | Wear depth (μm) | 8.3 | 9.3 | 9.7 | 7.4 | 8.5 | 7.7 |
| Stability test | Appearance | No deposition | No deposition | No deposition | No deposition | No deposition | No deposition |
| | Acid value (mgKOH/g) | 0.01 | 0.01 | 0.01 | 0.01 | 0.01 | 0.01 |

TABLE 5

|  |  | Example 6 | Example 7 | Example 8 | Example 9 | Example 10 |
| --- | --- | --- | --- | --- | --- | --- |
| Composition of base oil (% by mass, based on the total amount of the base oil) | 1 | — | — | — | — | — |
| | A1 | 70 | — | — | — | — |
| | A2 | — | 90 | 90 | 70 | 60 |
| | B1 | 30 | 10 | 10 | 30 | 40 |
| Composition of refrigerating machine oil (% by mass, based on the total amount of the refrigerating machine oil) | Base oil | 98.45 | 97 | 94.9 | 98 | 96.6 |
| | C1 | — | 2 | 4 | 1 | 2.4 |
| | C2 | 0.05 | — | — | — | — |
| | D1 | — | 0.5 | 1 | 0.5 | 0.5 |
| | D2 | 1 | — | — | — | — |
| | E1 | 0.5 | 0.5 | 0.1 | 0.5 | 0.5 |
| C/P | | 0.14 | 3.82 | 3.82 | 1.91 | 4.59 |
| Refrigerant | | HFO-1234yf | HFO-1234yf | HFO-1234yf | HFO-1234yf | HFO-1234yf |

TABLE 5-continued

|  |  | Example 6 | Example 7 | Example 8 | Example 9 | Example 10 |
|---|---|---|---|---|---|---|
| Antiwear property test | Wear depth (μm) | 5.3 | 6.1 | 6.2 | 4.5 | 4.8 |
| Stability test | Appearance | No deposition | No deposition | No deposition | No deposition | No deposition |
|  | Acid value (mgKOH/g) | 0.12 | 0.01 | 0.01 | 0.02 | 0.01 |

TABLE 6

|  |  | Comp. Example 12 | Comp. Example 13 | Comp. Example 14 | Comp. Example 15 | Comp. Example 16 |
|---|---|---|---|---|---|---|
| Composition of base oil (% by mass, based on the total amount of the base oil) | 1 | 60 | — | — | — | — |
|  | A1 | — | 60 | 70 | 70 | 70 |
|  | A2 | — | — | — | — | — |
|  | B1 | 40 | 40 | 30 | 30 | 30 |
| Composition of refrigerating machine oil (% by mass, based on the total amount of the refrigerating machine oil) | Base oil | 98.7 | 98.95 | 90.5 | 88.5 | 96 |
|  | C1 | 0.2 | 0.05 | — | — | — |
|  | C2 | — | — | 8 | 10 | 3 |
|  | D1 | 0.5 | 0.5 | — | — | — |
|  | D2 | — | — | 1 | 1 | 0.5 |
|  | E1 | 0.6 | 0.5 | 0.5 | 0.5 | 0.5 |
| C/P |  | 0.38 | 0.10 | 21.71 | 27.14 | 16.29 |
| Refrigerant |  | HFO-1234yf | HFO-1234yf | HFO-1234yf | HFO-1234yf | HFO-1234yf |
| Antiwear property test | Wear depth (μm) | 6.7 | 5.5 | 7.1 | 7.5 | 6.9 |
| Stability test | Appearance | No deposition | No deposition | No deposition | No deposition | No deposition |
|  | Acid value (mgKOH/g) | 0.03 | 0.75 | 0.01 | 0.01 | 0.01 |

TABLE 7

|  |  | Comp. Example 17 | Comp. Example 18 | Comp. Example 19 | Comp. Example 20 | Comp. Example 21 | Comp. Example 22 |
|---|---|---|---|---|---|---|---|
| Composition of base oil (% by mass, based on the total amount of the base oil) | 1 | — | — | — | — | — | — |
|  | A1 | 100 | — | — | — | — | — |
|  | A2 | — | 100 | 100 | 70 | 90 | 90 |
|  | B1 | — | — | — | 30 | 10 | 10 |
| Composition of refrigerating machine oil (% by mass, based on the total amount of the refrigerating machine oil) | Base oil | 95 | 93.4 | 92.4 | 95 | 94.9 | 93.4 |
|  | C1 | — | 5 | 6 | 4 | 4 | 5 |
|  | C2 | 4 | — | — | — | — | — |
|  | D1 | — | 1 | 1 | 0.5 | 0.5 | 1 |
|  | D2 | 0.5 | — | — | — | — | — |
|  | E1 | 0.5 | 0.6 | 0.6 | 0.5 | 0.6 | 0.6 |
| C/P |  | 21.71 | 4.78 | 5.73 | 7.65 | 7.65 | 4.78 |
| Refrigerant |  | HFO-1234yf | HFO-1234yf | HFO-1234yf | HFO-1234yf | HFO-1234yf | HFO-1234yf |
| Antiwear property test | Wear depth (μm) | 7.5 | 8.3 | 8.8 | 6.5 | 7.6 | 6.9 |
| Stability test | Appearance | No deposition | No deposition | No deposition | No deposition | No deposition | No deposition |
|  | Acid value (mgKOH/g) | 0.01 | 0.01 | 0.01 | 0.01 | 0.01 | 0.01 |

The invention claimed is:

1. A working fluid composition for a refrigerating machine, comprising:
   a refrigerating machine oil comprising an ester of a polyhydric alcohol and a fatty acid, a carbodiimide compound, and a phosphorus compound; and
   at least one refrigerant selected from 1,1,1,2-tetrafluoroethane and 2,3,3,3-tetrafluoropropene;
   wherein the polyhydric alcohol constituting the ester comprises pentaerythritol and dipentaerythritol,
   the fatty acid constituting the ester comprises at least one selected from fatty acids having 4 to 9 carbon atoms, and the carbodiimide compound and the phosphorus compound satisfy conditions represented by the following formula (1):

$$0.11 \leq \frac{\left(\frac{N_C}{M_C} \cdot W_C\right)}{\left(\frac{N_P}{M_P} \cdot W_P\right)} \leq 4.70 \quad (1)$$

wherein, $N_c$ represents a number of carbodiimide groups per molecule of the carbodiimide compound, $M_c$ represents a molecular weight of the carbodiimide compound, $W_c$ represents a content of the carbodiimide compound based on a total amount of the refrigerating machine oil, $N_p$ represents a number of phosphorus atoms per molecule of the phosphorus compound, $M_p$ represents a molecular weight of the phosphorus compound, and $W_p$ represents a content of the phosphorus compound based on a total amount of the refrigerating machine oil.

2. The working fluid composition for a refrigerating machine according to claim 1, wherein the ester comprises a mixture of a first ester that is an ester of pentaerythritol and at least one fatty acid selected from fatty acids having 4 to 9 carbon atoms and a second ester that is an ester of dipentaerythritol and at least one fatty acid selected from fatty acids having 4 to 9 carbon atoms.

3. The working fluid composition for a refrigerating machine according to claim 2, wherein a content of the second ester is 10% by mass or more and 40% by mass or less based on a total content of the first ester and the second ester.

4. The working fluid composition for a refrigerating machine according to claim 1, wherein the refrigerating machine oil further comprises 0.1% by mass or more and 0.5% by mass or less of 2,6-di-tert-butyl-p-cresol based on the total amount of the refrigerating machine oil.

5. A refrigerating machine oil comprising:
   an ester of a polyhydric alcohol and a fatty acid;
   a carbodiimide compound; and
   a phosphorus compound;
   wherein the polyhydric alcohol constituting the ester comprises pentaerythritol and dipentaerythritol,
   the fatty acid constituting the ester comprises at least one selected from fatty acids having 4 to 9 carbon atoms,
   the carbodiimide compound and the phosphorus compound satisfy conditions represented by the following formula (1):

$$0.11 \leq \frac{\left(\frac{N_C}{M_C} \cdot W_C\right)}{\left(\frac{N_P}{M_P} \cdot W_P\right)} \leq 4.70 \quad (1)$$

wherein, $N_c$ represents a number of carbodiimide groups per molecule of the carbodiimide compound, $M_c$ represents a molecular weight of the carbodiimide compound, $W_c$ represents a content of the carbodiimide compound based on a total amount of the refrigerating machine oil, $N_p$ represents a number of phosphorus atoms per molecule of the phosphorus compound, $M_p$ represents a molecular weight of the phosphorus compound, and $W_p$ represents a content of the phosphorus compound based on a total amount of the refrigerating machine oil, and
   the refrigerating machine oil is used together with at least one refrigerant selected from 1,1,1,2-tetrafluoroethane and 2,3,3,3-tetrafluoropropene.

* * * * *